(12) United States Patent
Joseph et al.

(10) Patent No.: US 7,347,371 B2
(45) Date of Patent: Mar. 25, 2008

(54) AIMING PATTERN FOR IMAGING-BASED BAR CODE READERS

(75) Inventors: Eugene Joseph, Coram, NY (US); Brad Carlson, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 286 days.

(21) Appl. No.: 11/341,950

(22) Filed: Jan. 27, 2006

(65) Prior Publication Data

US 2006/0118635 A1 Jun. 8, 2006

Related U.S. Application Data

(63) Continuation-in-part of application No. 10/903,792, filed on Jul. 30, 2004, now Pat. No. 7,303,131.

(51) Int. Cl.
*G06K 7/10* (2006.01)

(52) U.S. Cl. .............. 235/462.23; 235/462.1; 235/462.21; 235/462.42

(58) Field of Classification Search ........... 235/462.1, 235/462.2, 462.21, 462.23, 462.24, 462.08
See application file for complete search history.

(56) References Cited

U.S. PATENT DOCUMENTS

| | | | |
|---|---|---|---|
| 6,431,452 B2 * | 8/2002 | Feng | 235/472.01 |
| 6,918,538 B2 | 7/2005 | Breytman et al. | |
| 6,981,642 B2 * | 1/2006 | Krichever | 235/454 |
| 2005/0041881 A1 | 2/2005 | Recht | |
| 2005/0116041 A1 | 6/2005 | Zhu et al. | |

* cited by examiner

*Primary Examiner*—Seung Ho Lee
(74) *Attorney, Agent, or Firm*—Tarolli, Sundheim, Covell & Tummino LLP

(57) ABSTRACT

An aiming pattern is used with an automatic focusing system for an imaging-based bar code reader. The combination of the thick horizontal line and the thin vertical line yields an aiming pattern that can be effectively used for ranging purposes while at the same time providing sufficient illumination for decoding 1-D barcodes.

30 Claims, 3 Drawing Sheets

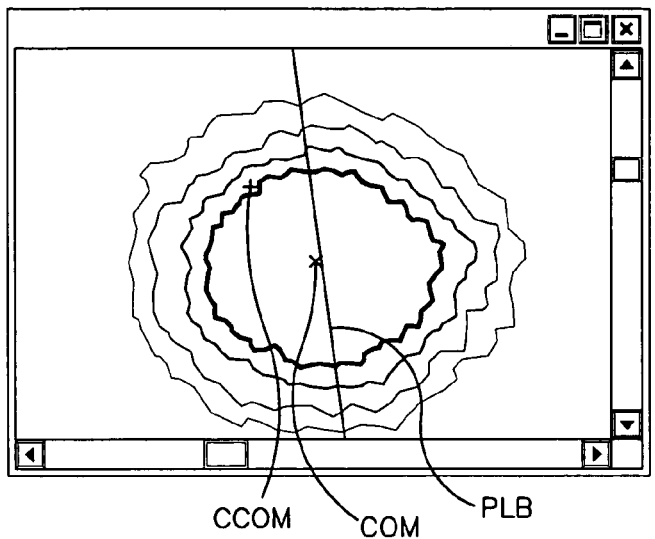
Fig.4
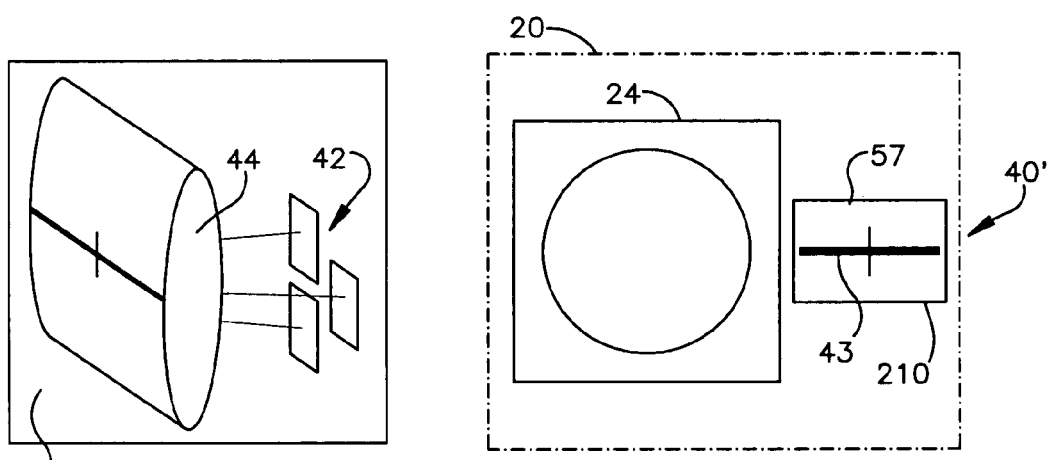
Fig. 5
Fig. 6
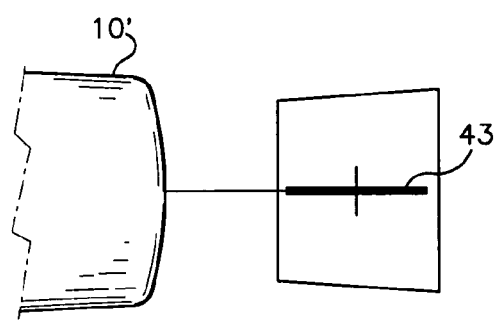
Fig. 7

AIMING PATTERN FOR IMAGING-BASED BAR CODE READERS

CROSS REFERENCE TO RELATED APPLICATIONS

This application is a continuation-in-part of U.S. patent application Ser. No. 10/903,792 filed on Jul. 30, 2004, now U.S. Pat. No. 7,303,131 which is assigned to the assignee of the present invention, and incorporated herein by reference in its entirety.

FIELD OF THE INVENTION

The present invention relates to an aiming pattern that can be used with an automatic focusing system for an imaging-based bar code reader.

BACKGROUND OF THE INVENTION

Various electro-optical systems have been developed for reading optical indicia, such as bar codes. A bar code is a coded pattern of graphical indicia comprised of a matrix or series of bars and spaces of varying widths, the bars and spaces having differing light reflecting characteristics. Systems that read and decode bar codes employing CCD or CMOS-based imaging systems are typically referred to as imaging-based bar code readers or bar code scanners.

Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging system processes the digitized signals and attempts to decode the imaged bar code.

The ability of an imaging system to successfully decode an imaged bar code is directly dependent upon the ability to move the lens to a suitable position whereby a satisfactorily clear image of the target bar code is focused onto the pixel array. The imaging system focusing lens is driven by a motor, such as a piezo motor, along an axis perpendicular to the pixel array or sensor plane to permit focusing of the bar code image on the pixel array.

Whether the imaging system is housed in a handheld, portable bar code reader or a permanently mounted reader, the user of the device cannot be expected to manually focus the imaging system by moving the lens, thus, there is a need for an automatic focusing system or auto focus system for an imaging system.

Bar code imaging systems require a variable focus optical system to maximize barcode reading range and deliver high quality images over a range of distances. The high scan rate for barcode reading imposes a high-speed requirement on the auto focusing technique to be used in the imaging system.

A typical two-dimensional barcode imaging scanner has an aiming pattern generator for the user to aim the scanner at the target and a separate illuminating system for illuminating the entire two-dimensional field of view. One auto-focusing technique that uses this aiming pattern is described in the referenced parent U.S. patent application Ser. No. 10/903,792 filed on Jul. 30, 2004, which is assigned to the assignee of the present invention, and incorporated herein by reference in its entirety. The auto-focusing technique described in the '792 application uses an apparent position of a feature in the aiming pattern within the image to calculate a distance between the scanner and the target surface. In the '792 application, the aiming pattern is described as being a single dot or a pattern of dots. One common aiming pattern is a line that the user aligns so that it cuts through the entire barcode approximately perpendicular to the bars of the barcode. A two-dimensional barcode imaging scanner that includes an aiming pattern that can be also used as an illumination source for reading a one-dimensional barcode is described in U.S. patent application Ser. No. 11/262,606 filed Oct. 31, 2005, which is assigned to the assignee of the present invention, and incorporated herein by reference in its entirety.

SUMMARY

An aiming pattern includes a relatively long and thick horizontal line and a perpendicular relatively short and thin vertical line that form a crosshair pattern. The combination of the thick horizontal line and the thin vertical line yields an aiming pattern that can be effectively used for ranging purposes while at the same time providing sufficient illumination for decoding 1-D barcodes.

A scanner is provided that processes indicia having an indicia area. The scanner includes an aiming pattern generator that emits a crosshair aiming pattern that includes a relatively thick horizontal line long enough to impinge upon and illuminate a strip of the indicia that encompasses the entire breadth of the indicia when the scanner is within an operative range of the indicia. The aiming pattern also includes a relatively thin vertical line that intersects the horizontal line. The scanner includes an imaging system with a pixel array and a focusing lens to focus an image of the target object onto the pixel array, the lens being movable along a path of travel. An automatic focusing system moves the lens along the path of travel to a position suitable for properly focusing an image of the target object onto the pixel array by analyzing a position of the crosshair aiming pattern within an image of the beam reflected from the target object and projected onto the pixel array by the lens. The automatic focusing system employs a distance algorithm to determine a distance between the imaging system and the target object and moves the lens along its path of travel to a suitable position for properly focusing the target object onto the pixel array.

It may be advantageous that the horizontal line has a relatively large thickness sufficient to cover speckle noise that would be collected by the segment of the two-dimensional array and/or if the two dimensional array is adapted such that a segment of the two-dimensional array corresponding to the swath illuminated by the aiming pattern can be read out in a shorter amount of time than is required to read out the entire two-dimensional array. The aiming pattern generator may also adjust an intensity of the aiming pattern based on the determined distance between the imaging system and the target object such that, for example, the aiming pattern generator increases the intensity of the aiming pattern as the determined distance increases.

BRIEF DESCRIPTION OF THE DRAWINGS

FIG. 4 is a schematic diagram of image formation in real aperture imaging;

FIG. 5 is a schematic representation of a lens and diode arrangement that can be used to form an aiming pattern according to one embodiment of the present invention;

FIG. 6 is a representation of the relative position the imager and aiming pattern generator according to one embodiment of the present invention; and FIG. 7 is a schematic representation of an aiming pattern projected on a target surface.

DETAILED DESCRIPTION

Figure 1:
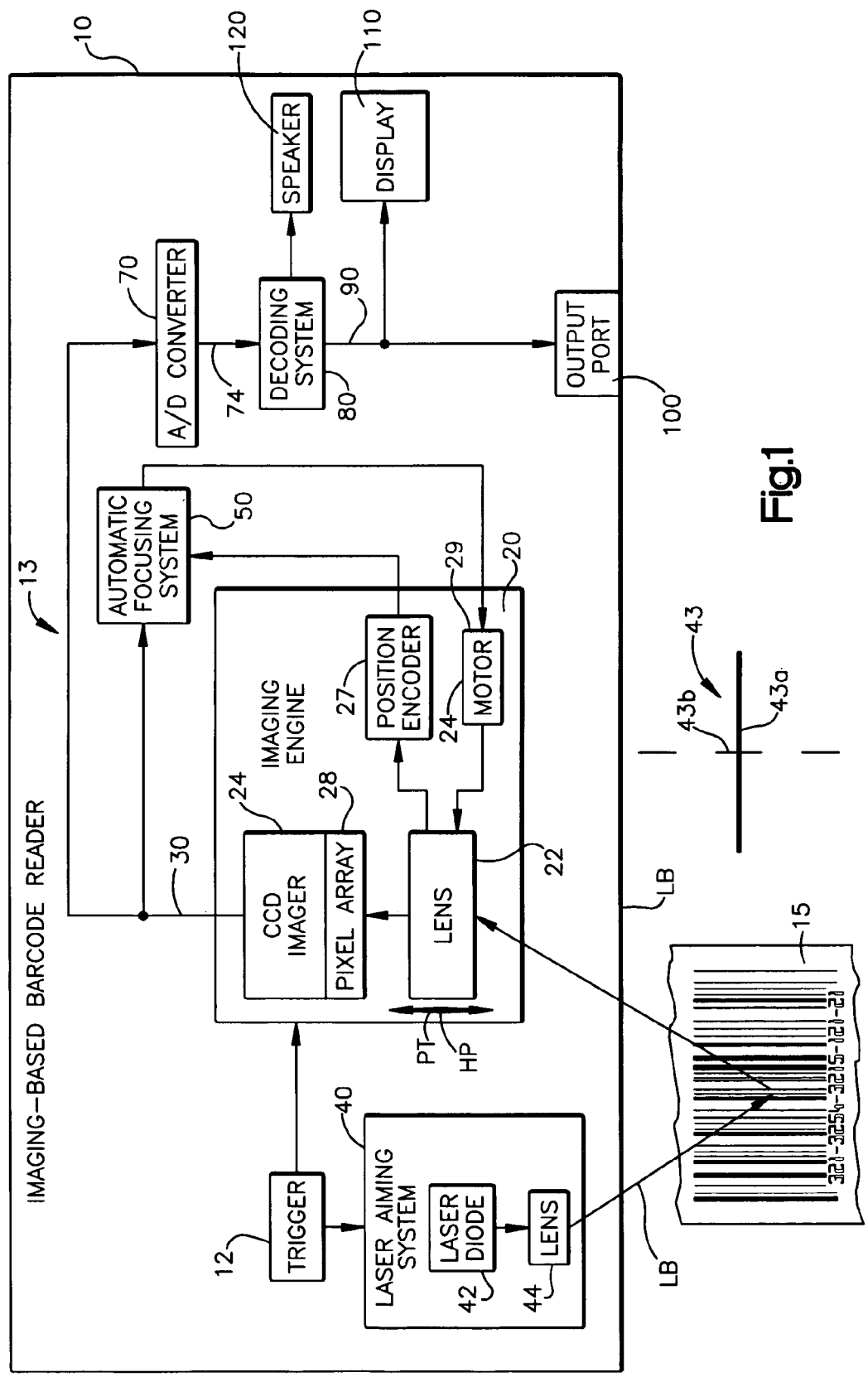
FIG. 1 is a schematic block diagram of an imaging-based bar code reader of the present invention having an automatic focusing system.

An imaging-based bar code reader is shown schematically at 10 in FIG. 1. The bar code reader 10, in addition to imaging and decoding both 1D and 2D bar codes and postal codes, is also capable of capturing images and signatures. In one preferred embodiment of the present invention, the bar code reader 10 is a hand held portable reader that can be carried and used by a user walking or riding through a store, warehouse or plant for reading bar codes for stocking and inventory control purposes.

However, it should be recognized that an aiming pattern of the present invention, to be explained below, may be advantageously used in connection with any type of imaging-based automatic identification system including, but not limited to, bar code readers, signature imaging acquisition and identification systems, optical character recognition systems, fingerprint identification systems and the like. It is the intent of the present invention to encompass all such imaging-based automatic identification systems.

The bar code reader 10 includes a trigger 12 coupled to the bar code reader circuitry 13 for initiating reading of a target bar code 15 positioned on an object when the trigger 12 is pulled or pressed. The bar code reader 10 includes an imaging system or engine 20 including a focusing lens 22, a CCD imager 24 and a position encoder 29 that provides position information regarding the lens as it moves along its path of travel PT. The focusing lens 22 focuses light reflected from the target bar code 15 onto an array of photosensors or pixels 28 of the CCD imager 24. At predetermined intervals, the pixels of pixel array 28 are read out generating an analog signal 30 representative of an image of whatever is focused by the lens 22 on the pixel array 28, for example, an image of the bar code 15. The analog image signal 30 is then digitized by an analog-to-digital converter 70 and a digitized signal 74 is decoded by decoder circuitry 80. Decoded data 90, representative of the data/information coded in the bar code 15 is then output via a data output port 100 and/or displayed to a user of the reader 10 via a display 110. Upon achieving a good "read" of the bar code 15, that is, the bar code 15 was successfully imaged and decoded, a speaker 120 is activated by the circuitry 13 to indicate to the user that the bar code has been successfully read.

Figure 3:
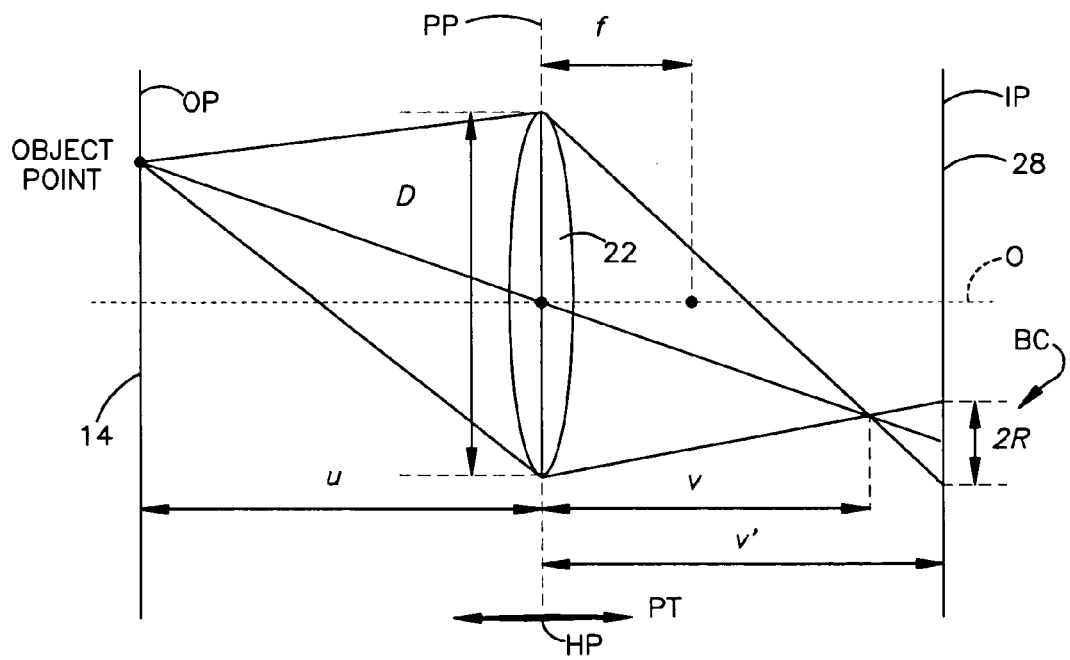
FIG. 3 is schematic diagram of an aiming pattern of the bar code reader of FIG. 1 as used to determine range from imaging engine to target object.

The focusing lens 22 is driven by a motor 29, such as a piezo motor, along its linear path of travel PT. The lens path of travel PT is along an optical imaging axis OA and orthogonal to a light receiving planar surface of the pixel array 28. It should be recognized that the lines labeled PT in FIGS. 1, 3 and 4 are schematic representations of the path of travel of the lens 22 and the lines merely illustrate the direction of the lens path of travel along the optical axis OA. As will be explained below, the automatic focusing system 50 causes the lens 22 to be moved from a home position HP along the path of travel PT to a position that is suitable for decoding the digitized signal 74 representative of the imaged bar code 15. (The home position may be the previous position of the lens.) Moreover, the time required for the automatic focusing system 50 to accomplish the movement of the lens 22 to a suitable position is typically on the order of 20 ms. or less.

The bar code reader 10 further includes an aiming pattern generator 40 that generates a visible aiming pattern 42 to aid the user in properly aiming the reader at the target bar code 15. In one preferred embodiment, the aiming apparatus 40 is a laser aiming apparatus. Alternatively, the aiming apparatus 40 may utilize an LED or another source of illumination known to those of skill in the art. As will be described in more detail below, the pattern 43 may be a pattern comprising a crosshair formed from a thick horizontal line and a perpendicular thin vertical line. In one preferred embodiment, the laser aiming apparatus 40 includes a laser diode 42 and a diffractive lens 44.

The automatic focusing system 50 employs a two step process to focus the image on the pixel array 28, that is, to move the lens 22 to a suitable position along its path of travel PT for successfully imaging and decoding the target bar code 15. The first step is laser ranging. The laser light emitted by the laser diode 42 to generate the laser aiming pattern 43 travels outwardly toward the target bar code 15. The laser beam impacts the bar code 15 or the object the bar code is affixed to and is reflected back toward the reader where it is focused on the pixel array 28 by the lens 22. Laser ranging utilizes the laser aiming apparatus 40 to determine an object distance u (shown in FIGS. 2 and 3) between a principal plane PP of the lens 22 and the object plane OP, that is, a surface of the target bar code 15, along the optical axis OA. The object distance u is computed using a parallax distance algorithm.

Using geometric relationships, the parallax distance algorithm determines the object distance u. Given that the object distance u has been determined and further given that the focal length f of the lens is known, the image distance v can be computed using the standard lens equation (Thin Lens law) $1/f=1/u+1/v$. The image distance v is the distance between the principal plane PP of the lens 22 and the image plane IP, that is, a light receiving surface of the pixel array 28. The automatic focusing system then moves the lens 22 along its path of travel PT to a suitable position such that a satisfactory image of the laser aiming pattern is focused onto the pixel array 28.

If laser ranging is not successful in determining the distance between the lens 22 and the bar code 15 the automatic focusing system 50 proceeds to focus analysis to determine a suitable position for the lens 22 to decode the imaged bar code 15. In focus analysis, multiple frames or images of the target bar code 15 are read out from the pixel array 28 at different lens positions. The images are analyzed for image clarity by the automatic focusing system 50 and a suitable position for the lens 22 is determined. Movement of the lens from the home position HP along its path of travel PT is determined via a search routine or heuristic which seeks a satisfactory focus position.

Laser Ranging

The laser diode 42 produces the aiming pattern 43 that assists the user in aiming the reader at the target bar code 15. Using the laser light reflected from the bar code 15, the same laser beam pattern 43 can be used to determine the object distance u (FIG. 2) from the pixel array 28 to the target bar code 15. Utilizing a standard lens formula, the object distance u of the target bar code 15 is translated to the image distance required to achieve a focused image of the target bar code 15 on the pixel array 28. This, in turn, determines the desired lens position along its path of travel PT.

Figure 2:
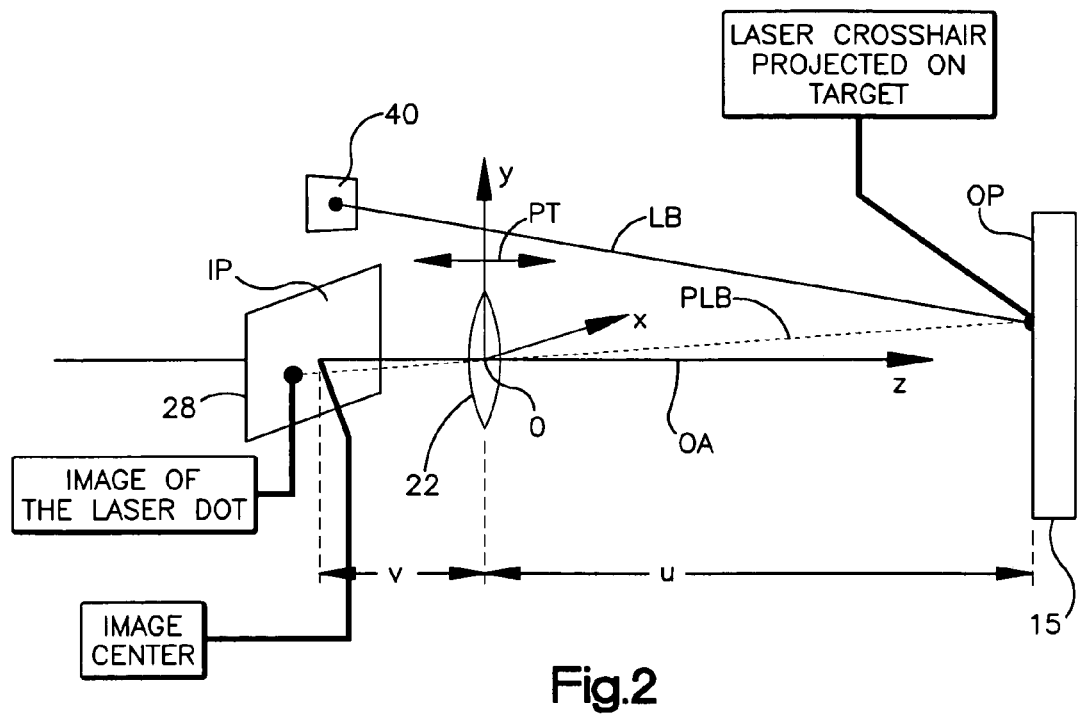
FIG. 2 is a schematic view of the overall functioning of the automatic focusing system.

In order to estimate the distance u of the lens 22 to the bar code 15, the crosshair aiming pattern is projected onto the bar code and an image of the laser pattern reflected from the bar code 15 is projected onto the pixel array 28. Turning to FIG. 2, the z-axis of the reference coordinate system is defined by the optical axis, OA, and the origin O is defined by the intersection of the z-axis with the principal plane of the lens 22. A 3D vector V is represented by:

$$V = v + z\hat{z}, \quad v \cdot \hat{z} = 0,$$

where v is the projection of V on the image plane (that is, the plane of the pixel array 28) and z is the projection on the z-axis.

The laser beam (the line labeled LB in FIG. 2) can be modeled as a 3D line:

$$l = g + \beta z, \tag{1}$$

where g and β are 2D vectors that define the position and direction of the laser beam, respectively. Let α be a 2D vector that represents $P_i$, the projection of the laser dot P on the image plane. According to the law of perspective projection:

$$l = \alpha z, \quad \alpha = f_{bl} v_{pi}, \tag{2}$$

where $f_{bl}$ is the back focal length and $v_{pi}$ is the 2D coordinate of $P_i$.

Combining equations (1) and (2) and solving for z:

$$z = \frac{g^2}{(\alpha - \beta)g}. \tag{3}$$

g and β can be obtained through calibration (see Section 2.2). Once the crosshair aiming pattern is located in the image, z can be computed using equation (3). Note that the back focal length f does not appear in (3) since α is represented in number of pixels. The object distance u of the principal plane PP of the lens 22 to the target bar code 15 is, therefore, u=z.

Calibration of Laser Beam

To calibrate the laser beam LB, from equations (1) and (2):

$$(\alpha - \beta)z = g. \tag{4}$$

Rewriting equation (4):

$$[g \; \beta] \cdot \begin{bmatrix} 1 \\ z \end{bmatrix} = \alpha z. \tag{5}$$

There are two unknowns to calibrate, g and β. Theoretically, only two measurements are needed to get g and β. However, in order to minimize the measurement error, multiple measurements are collected and least squares is used to get the optimal values.

Assume n measurements, the n inputs can be written as:

$$Z \cdot v = C, \text{ where} \tag{6}$$

$$Z = \begin{bmatrix} 1 & z_1 \\ 1 & z_2 \\ \vdots & \vdots \\ 1 & z_n \end{bmatrix}, \; v = \begin{bmatrix} g \\ \beta \end{bmatrix}, \; C = \begin{bmatrix} \alpha_1 z_1 \\ \alpha_2 z_2 \\ \vdots \\ \alpha_n z_n \end{bmatrix}.$$

Define an error vector E as E=Z·v−C, since Z·v is the laser spot defined by the line equation of the laser beam LB, and C is the same point but derived from the line equation from the 2D projection in the image. Minimizing $E^2$ yields $$Z'(Z \cdot v - C) = 0. \tag{7}$$

Expanding equation (7):

$$\begin{bmatrix} n & \sum_{i=1}^{n} z_i \\ \sum_{i=1}^{n} z_i & \sum_{i=1}^{n} z_i^2 \end{bmatrix} \cdot \begin{bmatrix} g \\ \beta \end{bmatrix} = \begin{bmatrix} \sum_{i=1}^{n} \alpha_i z_i \\ \sum_{i=1}^{n} \alpha_i z_i^2 \end{bmatrix}. \tag{8}$$

Multiplying both sides with the inverse of the coefficient matrix:

$$\begin{bmatrix} g \\ \beta \end{bmatrix} = \begin{bmatrix} n & \sum_{i=1}^{n} z_i \\ \sum_{i=1}^{n} z_i & \sum_{i=1}^{n} z_i^2 \end{bmatrix}^{-1} \cdot \begin{bmatrix} \sum_{i=1}^{n} \alpha_i z_i \\ \sum_{i=1}^{n} \alpha_i z_i^2 \end{bmatrix}. \tag{9}$$

In the perspective projection model, z-bias needs to be taken care of. Dividing z on both sides of equation (5) results in:

$$[g \; \beta] \cdot \begin{bmatrix} \frac{1}{z} \\ 1 \end{bmatrix} = \alpha, \tag{10}$$

and consequently equation (6) becomes $$\begin{bmatrix} g \\ \beta \end{bmatrix} = \begin{bmatrix} \sum_{i=1}^{n} \frac{1}{z_i^2} & \sum_{i=1}^{n} \frac{1}{z_i} \\ \sum_{i=1}^{n} \frac{1}{z_i} & n \end{bmatrix}^{-1} \cdot \begin{bmatrix} \sum_{i=1}^{n} \frac{\alpha_i}{z_i} \\ \sum_{i=1}^{n} \alpha_i \end{bmatrix}. \tag{11}$$

Thus, g and β have been solved. Notice that the solution of g and β contains $f_{bl}$, the back focal length. When computing z using equation (3), $f_{bl}$ will be cancelled out. Thus in practice, the coordinates in number of pixels are represented directly.

The auto focus system 50 calibrates g and β relative to a reference position or home position HP of the lens 22 and magnification is corrected in the calculation.

Precision of Laser Ranging

Assuming g and β are constants, differentiating both sides of equation (4) results in:

$$\frac{dz}{z} = -\frac{z \cdot g}{g^2} d\alpha. \tag{12}$$

This suggests that the relative precision of z is linearly proportional to dα. However there are errors, either in calibration of g and β, or caused by other systematic reasons. Taking g and β as variables results in:

$$\frac{dz}{z} = \frac{g \cdot dg}{g^2} - \frac{z \cdot g \cdot d\alpha}{g^2} + \frac{z \cdot g \cdot d\beta}{g^2} \tag{13}$$

The goal of the auto focusing system 50 is to bring the image into focus. The depth of field of the imaging system 20 permits imprecision in the range measurement. The autofocusing system 50 is, therefore, interested in the image space in which the error of the ranging (that is, the error in determining u) is transformed into the error in image distance v, which in turn is reflected as the blur circle BC in the image. FIG. 3 illustrates the geometric relationship between radius of the blur circle BC and the offset in image distance. After the object distance u is computed, given the focal length f, the image distance v is computed. Given that the lens 22 is in its home position HP along the path of travel PT, it is unlikely that the actual distance (shown as v' in FIG. 4) between the principal plane PP of the lens 22 and the image plane IP (surface of the pixel array 28) is equal to the image distance v. Thus, the image of the laser dot projected on the pixel array 28 is an unfocused blur circle BC. The automatic focusing system 50 then must move the lens 22 along its path of travel so that a sharp image is focused on the pixel array 28. However, in accordance with the Thin Lens law (1/f=1/u+1/v) note that as the lens 22 moves along the path of travel PT, the object distance u and image distance v both change.

The diffraction blur is not considered by the auto focusing system 50 since size of the error disk caused by diffraction is sub-pixel and the pixel array 28 is assumed to be a mega-pixel configuration. The radius of the blur circle BC is:

$$R = \frac{D}{2}\left(\frac{v'-v}{v}\right) = \frac{D}{2} \cdot \frac{\delta v}{v} \tag{14}$$

The Thin Lens law provides:

$$\frac{1}{u} + \frac{1}{v} = \frac{1}{f}. \tag{15}$$

Differentiating both sides of equation (15) results in:

$$\frac{du}{u^2} = -\frac{dv}{v^2}. \tag{16}$$

In practice, there are other error sources that will impact the focusing results, for example the inherent error of the piezo motor 29, i.e. the difference between the desired position the automatic focusing system 50 wants the motor to move the lens 22 to and the actual position the motor moves the lens to. Taking this into consideration, equation (14) can be rewritten:

$$R = \frac{D}{2} \cdot \left(-\frac{v}{u} \cdot \frac{\delta u}{u} + \frac{\delta v_m}{v}\right), \tag{17}$$

where $\delta v_m$ is the average motor error.

Substituting equation (13) into (17) results in:

$$R = \frac{D}{2} \cdot \left(-\frac{v-f}{f} \cdot \frac{g \cdot dg}{g^2} + \frac{v \cdot g \cdot d\alpha}{g^2} - \frac{v \cdot g \cdot d\beta}{g^2} + \frac{\delta v_m}{v}\right). \tag{18}$$

g and β are calibrated relative to a camera coordinate system. In the auto focus system 50 where the lens 22 moves, i.e. the origin of the coordinate system moves, the offset of the origin dominates the errors of g and β. The lens moves along the z-axis (that is, along optical axis OA) only. Thus, $$\delta g = g + \beta \cdot \delta z - g = \beta \cdot \delta z \tag{19}$$

Since the lens 22 moves along the z-axis only, dβ is 0. Thus, equation (18) simplifies to:

$$R = \frac{D}{2}\left(-\frac{v-f}{f} \cdot \frac{g \cdot \beta \cdot (k\delta z)}{g^2} + \frac{v \cdot g \cdot d\alpha}{g^2} + \frac{\delta v_m}{v}\right). \tag{20}$$

In equation (18), the first part in the parenthesis is of the same order as the other two parts and thus cannot be ignored. A position encoder 27 (FIG. 1) installed in the imaging engine 20, system provides real-time readings of the lens position along its path of travel PT relative to a home position HP, which can be calibrated when the imaging system 20 is assembled. Thus, the error can be corrected and equation (20) can be simplified to the following:

$$R = \frac{D}{2} \cdot \left(\frac{v \cdot g \cdot d\alpha}{g^2} + \frac{\delta v_m}{v}\right). \tag{21}$$

The automatic focusing system 50 uses equation (21) to estimate the pixel location accuracy needed to meet the desired focusing requirement, or vise versa. By increasing aperture size, focal length, or reducing pixel size, offset of the laser beam, dα will decrease, i.e, higher accuracy in pixel location will be needed.

Locating the Aiming Pattern 43

The essence of laser ranging is locating the center of the aiming pattern 43 which is located at the intersection of the thick horizontal line 43a and the thin vertical line 43b. Considering the image of the laser beam is highly blurred when the lens 22 is out of focus, it is necessary for the automatic focusing system 50 to identify a region of interest (ROI) of the laser spot, i.e., the region where the aiming pattern 43 lies and its blurred peripheral, and compute the center of mass (COM):

$$X = \frac{\sum_i i * I(i)}{\sum_i I(i)}, \quad (22)$$

where i indicates the x coordinate of the pixels within the ROI and I(i) their corresponding intensity. The same applies to the Y coordinate.

A detailed theoretical analysis of the COM computation is presented in an article entitled "Novel Denoising Algorithm for Obtaining a Superresolved Position Estimation" by Z. Zalevsky, et al., *Opt. Eng.*, 41(6), pp. 1350-1357, June 2002. The foregoing article is incorporated in its entirety by reference herein. However, given that the imaging engine 20 is used as an imager, the background is likely to overlap with high frequency patterns and thus become the dominant source of noise, the quantization error and shot noise can be ignored.

Note that the magnification changes with movement of the lens 22 and this effect cannot be ignored. A projection line of the laser beam is normalized according to the real-time lens position by the automatic focusing system 50, and the final coordinates of the aiming pattern center are normalized with respect to magnification.

The process used by the automatic focusing system 50 for locating the center of the aiming pattern is illustrated in FIG. 4. The aiming pattern is highly blurred. The line PLB indicates the pre-computed projection of the laser beam on the image plane (pixel array 28) with the magnification corrected. Pixels with intensity considered "bright" are in light color. The COM of the bright region is marked COM. The pixel marked CCOM is the COM after magnification is corrected. Shape analysis can be applied to filter noise. A simpler alternative is to repeat the COM computation until all highlighted pixels are within a reasonable distance of the center.

The heart of the problem is locating the ROI. The automatic focusing system 50 searches along the laser projection line PLB to determine the threshold of "bright" pixels. To reduce the search time, the automatic focusing system 50 employs a sampling and search algorithm that samples every other pixel both in row and in column. Meanwhile, the automatic focusing system 50 accumulates statistics in blocks so that it can quickly locate the blocks containing those bright pixels after the threshold is determined, and thus avoid a second pass of the search. The statistics accumulated are the maximum intensity of every block. After the brightness threshold is determined from the histogram, the algorithm used by the automatic focusing system 50 goes through the blocks and identifies those with maximum intensity beyond the threshold.

The automatic focusing system algorithm chooses the width of the block to be the maximum possible width of the aiming pattern 43 (under blur), and the height of the block to be half of the width. Thus, the aiming pattern 43 can cover at most three consecutive blocks. This can be used to eliminate stochastic bright spots in the scene. If the automatic focusing system 50 finds more than 3 blocks with maximum intensity greater than the threshold, or 3 such blocks that are not next to each other, the algorithm halts because multiple bright spots are detected in the scene. Once the blocks that contain the aiming pattern 42 are correctly identified, the COM can be computed. The subsampling rate and block size can be adjusted to achieve the best performance of the search algorithm.

Aiming Pattern Used as 1-D Illumination

U.S. patent application Ser. No. 10/903,792 describes an imaging scanner that generates an aiming line that can be used concurrently as illumination for reading a one-dimensional or simple two-dimensional barcodes. The scanner includes an imaging system 20 having a two-dimensional array of sensors such as CCD or CMOS sensors that sense light reflected back from the target surface and form pixel data corresponding to an image of the target. It is advantageous to use an array sensor that has the capability to output a portion of pixels upon request, so that the transfer time and processing time can be shortened when only a portion of the array is properly exposed. One such sensor is a CMOS array made by Micron having part number MT9M001. The pixel data from the array is converted into digital data by an A/D converter 70 that is decoded by decoding system 80. An output port or display 110 provides the results of decoding to a peripheral device (not shown) or displays them to the user. The scanner 10 also includes an illumination source (not shown) that is capable, within a prescribed scanner range, of illuminating a portion of the target surface sufficient to fill the entire two-dimensional array of sensors with data. The scanner includes an aiming pattern generator 40 that includes one or more laser diodes 42 and a focusing lens 44 (see FIG. 1) that is activated by a user actuated trigger 12.

The aiming pattern generator 40 generates an aiming line (or pattern) that is concurrently used as illumination for a narrow segment of the two-dimensional imaging array when the scanner is being operated in a narrow window scanning, or 1-D, mode. In 1-D mode, the user aligns the aiming/illumination line on the barcode and data from a narrow segment of the two-dimensional array is read out and decoded. For a one-dimensional barcode, data from the narrow segment of the array is sufficient to decode the barcode. If the decode is successful, the full-scale illumination is never activated, saving time and power. Therefore the scanner can decode one-dimensional barcodes much more aggressively than two-dimensional barcodes. The frame read-out time for the narrow segment of the array can be orders of magnitude shorter than the read-out time for the entire array. The amount of light delivered in the aiming/illumination line can be much brighter than that delivered to the entire two-dimensional target area, thus improving the working range of the scanner with respect to one-dimensional barcodes.

The ability to operate in 1-D mode can be especially advantageous for high resolution imaging scanners having frame read-out times over 33 milliseconds and can be used with scanners that use color sensors. 1-D mode operation can be provided in camera-enabled mobile phones and mobile computers to minimize power dissipation and improve scanning performance. While the color of the aiming/illumination line is not important for monochrome sensors, it is advantageous to use a white or green line for color sensors. If green light is used with color sensors, then two adjacent rows of the sensor array can be merged to form a full-resolution line across the barcode. If white light is used, then all of the colors of the sensor can be used. 1-D mode can be used with sensors that have a global or rolling electronic shutter, or a mechanical shutter.

FIGS. 5-6 illustrate two possible aiming/illumination line generating systems 40. In FIG. 5 a cylindrical lens 44 focuses light output from LEDs 42 into a narrow band. The several LEDs can be turned on individually to narrow the aiming/illumination line or together to widen the line. Staggering the effective areas of the LEDs as shown reduces the likelihood of gaps in the illumination pattern. Depending on the amount of light needed to decode a one-dimensional barcode, more LEDs can be switched on automatically or by the user.

It is also possible to have multiple rows of LEDs for the aiming/illumination line such that if a PDF417 barcode is detected, more rows of LEDs are switched on and the vertical field of view is opened dynamically to read the barcode. The user may switch to a PDF417 mode to activate the additional LEDs or an auto-discrimination function may be used to detect the presence of a PDF417 barcode on the target. Using several lines of LED illumination can improve the depth of field because the illumination can be significantly brighter than full field illumination.

FIG. 6 shows an alternative embodiment of an aiming pattern generator 40'. A laser (not shown) can be placed behind an optical element 210 to generate the aiming pattern 43 that is bright enough to illuminate a one dimensional barcode for decoding. Advantageously, the aiming pattern 43 consists of a horizontal line bisected by a vertical line (also shown in FIG. 7). The combination of the thick horizontal line and the thin vertical line yields an aiming pattern that can be effectively used for ranging purposes while at the same time providing sufficient illumination for decoding 1-D barcodes. Additionally, the aiming pattern can include an outline 57 to aid the user in determining whether the entire barcode is within the imaging area of the scanner.

To lessen the effects of "speckle noise" or bright spots in the image that are typically created by a laser, the horizontal line is made relatively thick and bright so that bright light from the aiming pattern more than covers the target area corresponding to the segment of the array that is used for decoding. In addition the thickness of the horizontal line can provide sufficient illumination of a swath of the barcode to allow for multiple decode attempts or allow for signal processing such as averaging that can improve the signal to noise ratio. This signal processing may compensate for the presence of speckle noise. While the thickness of the horizontal component of the crosshair adds some uncertainty to the location of the crosshair and consequently to the distance of the target. This uncertainty can be reduced by locating the aiming pattern generating system horizontally with respect to the imaging system 24 as shown in FIG. 6.

The horizontal line is used primarily for illumination and the vertical line is the primary source of information for ranging. Since the vertical line is thin, the uncertainty as to its location is reduced and the accuracy of the range information is increased. This arrangement can also result in fast auto-exposure settling times. The outline 57 can provide a high frame rate for 1-D barcodes and fast auto-exposure settling times. In addition, the outlined cross hair of the aiming pattern causes the user to align a 1-D barcode so that the elements are perpendicular to the horizontal line and contained within the outline. This facilitates the capture of a swath of data from the center of the 1-D barcode that can be readily decoded.

A crosshair aiming pattern that includes a bright thick horizontal line and a thin vertical line provides additional benefits. The bright horizontal line improves the working range of the 1-D decoding system. The bright horizontal line reduces exposure times and increases hand jitter tolerance. Ranging with the vertical line ensures well exposed and focused images, in those cases when focus is variable.

The ranging information can also be used to adjust the intensity of the thick horizontal line. If the target is far away, then the intensity can be maximized to improve signal quality. If the target is near, then the intensity can be reduced to minimize power dissipation.

While the present invention has been described with a degree of particularity, it is the intent that the invention includes all modifications and alterations from the disclosed design falling with the spirit or scope of the appended claims.

We claim:

1. A scanner that processes indicia having an indicia area comprising:
    an aiming pattern generator that emits a crosshair aiming pattern that includes a relatively thick horizontal line long enough to impinge upon and illuminate a strip of the indicia that encompasses the entire breadth of the indicia when the scanner is within an operative range of the indicia, the aiming pattern also including a relatively thin vertical line that intersects the horizontal line;
    an imaging system that includes a pixel array, a focusing lens to focus an image of the target object onto the pixel array, the lens movable along a path of travel; and
    an automatic focusing system operating to move the lens along the path of travel to a position suitable for properly focusing an image of the target object onto the pixel array, the automatic focusing system analyzing a position of the crosshair aiming pattern within an image of the beam reflected from the target object and projected onto the pixel array by the lens and employing a distance algorithm to determine a distance between the imaging system and the target object and moving the lens along its path of travel to a suitable position for properly focusing the target object onto the pixel array.

2. The scanner of claim 1 wherein a segment of the two-dimensional array sensors is capable of collecting data corresponding to an image of the portion of the indicia illuminated by the horizontal line.

3. The scanner of claim 2 comprising a decoder that selectively receives and decodes data from the segment of the two-dimensional array of sensors to process the indicia.

4. The scanner of claim 2 wherein the horizontal line has a relatively large thickness sufficient to cover speckle noise that would be collected by the segment of the two-dimensional array.

5. The scanner of claim 2 wherein the two dimensional array is adapted such that the segment of the two-dimensional array can be read out in a shorter amount of time than is required to read out the entire two-dimensional array.

6. The scanner of claim 1 wherein the aiming pattern generator includes one or more LEDs.

7. The scanner of claim 6 wherein the LEDs are arranged in one or more staggered rows.

8. The scanner of claim 6 wherein each of the one or more LEDs can be selectively activated.

9. The scanner of claim 1 wherein the aiming pattern generator includes a focusing lens.

10. The scanner of claim 1 wherein the aiming pattern generator includes a laser and an optical element that forms the aiming pattern.

11. The scanner of claim 1 wherein the aiming pattern includes a rectangular outline surrounding the horizontal and vertical lines.

12. The scanner of claim 1 wherein the aiming pattern generator adjusts an intensity of the aiming pattern based on the determined distance between the imaging system and the target object.

13. The scanner of claim 12 wherein the aiming pattern generator increases the intensity of the aiming pattern as the determined distance increases.

14. A method of focusing an image of a target object on an imaging system of an automatic identification system including an imaging system including a pixel array, a focusing lens to focus an image of the target object onto the pixel array, the lens movable along a path of travel, the method comprising:
generating a crosshair aiming pattern that includes a relatively thick horizontal line perpendicularly intersected by a relatively thin vertical line beam to aid in aiming the system at a target object when the system is actuated;
analyzing a location of the crosshair aiming pattern within an image of the beam reflected from the target object and projected onto the pixel array by the lens and employing a distance algorithm to determine a distance between the imaging system and the target object based on the position of the crosshair aiming pattern; and
moving the lens along the path of travel to a suitable position for properly focusing the target object onto the pixel array based on the determined distance.

15. The method of focusing an image of claim 14 wherein the target object is a bar code to be imaged and decoded.

16. The method of focusing an image of claim 14 wherein the distance algorithm is a parallax distance algorithm based on the parallax or offset between the beam and an imaging axis.

17. The method of focusing an image of claim 14 wherein the aiming pattern includes a rectangular outline that surrounds the horizontal and vertical lines.

18. The method focusing an image of claim 14 further comprising:
illuminating a portion of the indicia with the horizontal line of the crosshair aiming pattern generated by the scanner;
collecting data indicative of an image reflected back from the illuminated portion of the indicia in a segment of the two dimensional array of light sensors; and
decoding the indicia based on the collected data from the portion of the indicia that is illuminated by the horizontal line.

19. The method of claim 18 wherein an intensity of the aiming pattern is adjusted based on the determined distance between the imaging system and the target object.

20. The method of claim 19 wherein the intensity of the aiming pattern is increased as the determined distance increases.

21. The method of claim 14 wherein the aiming pattern is generated by powering one or more LEDs.

22. The method of claim 14 wherein the aiming pattern is generated by powering a laser.

23. The method of claim 22 wherein aiming pattern is generated by causing the laser to act upon an optical element to form the aiming pattern from light from the laser.

24. Computer readable media having computer-executable instructions stored thereon for focusing an image of a target object on an imaging system of an automatic identification system including an imaging system including a pixel array, a focusing lens to focus an image of the target object onto the pixel array, the lens movable along a path of travel, the instructions comprising:
generating a crosshair aiming pattern that includes a relatively thick horizontal line perpendicularly intersected by a relatively thin vertical line beam to aid in aiming the system at a target object when the system is actuated;
analyzing a location of the crosshair aiming pattern within an image of the beam reflected from the target object and projected onto the pixel array by the lens and employing a distance algorithm to determine a distance between the imaging system and the target object based on the position of the crosshair aiming pattern; and
moving the lens along the path of travel to a suitable position for properly focusing the target object onto the pixel array based on the determined distance.

25. The computer readable media of claim 24 wherein instructions for analyzing the location of the crosshair aiming pattern employ a parallax distance algorithm based on the parallax or offset between the beam and an imaging axis.

26. The computer readable media of claim 24 wherein the aiming pattern includes a rectangular outline that surrounds the horizontal and vertical lines.

27. The computer readable media of claim 24 wherein the instructions further comprise:
illuminating a portion of the indicia with the horizontal line of the crosshair aiming pattern generated by the scanner;
collecting data indicative of an image reflected back from the illuminated portion of the indicia in a segment of the two dimensional array of light sensors; and
decoding the indicia based on the collected data from the portion of the indicia that is illuminated by the horizontal line.

28. The computer readable media of claim 27 wherein the instructions further comprise adjusting an intensity of the aiming pattern based on the determined distance between the imaging system and the target object.

29. The computer readable media of claim 24 wherein the intensity of the aiming pattern is increased as the determined distance increases.

30. Apparatus that processes indicia having an indicia area comprising:
means for emitting a crosshair aiming pattern that includes a relatively thick horizontal line long enough to impinge upon and illuminate a strip of the indicia that encompasses the entire breadth of the indicia when the apparatus is within an operative range of the indicia, the aiming pattern also including a relatively thin vertical line that intersects the horizontal line;
means for imaging that includes a pixel array, a focusing lens to focus an image of the target object onto the pixel array, the lens movable along a path of travel; and
means for moving the lens along the path of travel to a position suitable for properly focusing an image of the target object onto the pixel array, the means for moving analyzing a position of the crosshair aiming pattern within an image of the beam reflected from the target object and projected onto the pixel array by the lens and employing a distance algorithm to determine a distance between the imaging system and the target object and moving the lens along its path of travel to a suitable position for properly focusing the target object onto the pixel array.

* * * * *